(12) United States Patent
Scheib et al.

(10) Patent No.: US 6,497,432 B2
(45) Date of Patent: Dec. 24, 2002

(54) STRUCTURAL ATTACHMENT SYSTEM AND METHOD FOR A VEHICLE

(75) Inventors: Charles Joseph Scheib, Kettering, OH (US); David C McClellan, Xenia, OH (US); Stephen Moore Pitrof, Bellbrook, OH (US); Richard Allen Merrifield, Spring Valley, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/732,052

(22) Filed: Dec. 7, 2000

(65) Prior Publication Data

US 2001/0024035 A1 Sep. 27, 2001

Related U.S. Application Data

(60) Provisional application No. 60/225,894, filed on Aug. 17, 2000, provisional application No. 60/184,043, filed on Feb. 22, 2000, and provisional application No. 60/184,002, filed on Feb. 22, 2000.

(51) Int. Cl.[7] .............................. B62D 1/16; B62D 25/14
(52) U.S. Cl. .............................. 280/779; 180/90; 296/70
(58) Field of Search .................................. 280/779, 780; 180/90; 296/70, 72

(56) References Cited

U.S. PATENT DOCUMENTS

| | | | | |
|---|---|---|---|---|
| 4,733,739 A | * | 3/1988 | Lorenz et al. | 280/779 |
| 5,088,571 A | * | 2/1992 | Burry et al. | 280/779 |
| 5,180,189 A | * | 1/1993 | Moreno | 280/779 |
| 5,326,130 A | | 7/1994 | Gedeon et al. | 280/752 |
| 5,556,153 A | | 9/1996 | Kelman et al. | 296/70 |
| 5,564,769 A | | 10/1996 | Deneau et al. | 296/72 |
| 5,676,216 A | | 10/1997 | Palma et al. | 180/90 |
| 5,709,601 A | | 1/1998 | Heck | 454/121 |
| 5,979,965 A | | 4/1999 | Nishijima et al. | 296/70 |
| 5,957,498 A | * | 9/1999 | Holland et al. | 280/779 |
| 6,027,088 A | * | 2/2000 | Stedman et al. | 280/779 |
| 6,073,987 A | * | 6/2000 | Lindberg et al. | 180/90 |
| 6,110,037 A | | 8/2000 | Yoshinaka | 454/143 |
| 6,203,092 B1 | | 3/2001 | Yoshinaka | 296/70 |

FOREIGN PATENT DOCUMENTS

| | | | | |
|---|---|---|---|---|
| EP | 0960785 A2 | 12/1999 | ......... | B60R/21/045 |
| JP | 2000103307 | 4/2000 | ......... | B60R/21/045 |
| WO | WO 00/50292 | 8/2000 | ......... | B62D/25/14 |

OTHER PUBLICATIONS

International Search Report, corresponding to International Application No. PCT/US 01/40389, dated Aug. 6, 2001.

* cited by examiner

*Primary Examiner*—Peter C. English
(74) *Attorney, Agent, or Firm*—Kathryn A. Marra

(57) ABSTRACT

A structural attachment system for a vehicle is provided. The structural attachment system includes a first structural member and a vehicle component. The structural attachment system also includes an attachment assembly arranged relative to the first structural member and the vehicle component. The attachment assembly is designed and positioned to reinforce a load bearing area and to distribute a load of the vehicle component over the first structural member.

38 Claims, 11 Drawing Sheets

STRUCTURAL ATTACHMENT SYSTEM AND METHOD FOR A VEHICLE

CROSS REFERENCE TO RELATED APPLICATIONS

This application claims the benefit of U.S. Provisional Patent Application Ser. No. 60/184,043 filed Feb. 22, 2000, U.S. Provisional Patent Application Ser. No. 60/225,894 filed Aug. 17, 2000, and U.S. Provisional Patent Application, Serial No. 60/184,002, filed on Feb. 22, 2000, the contents of which are incorporated herein by reference thereto.

This application is also related to U.S. Patent Application, Serial No. 60/183,949, filed Feb. 22, 2000 which is commonly owned by Delphi Technologies, Inc., the contents of which are incorporated herein by reference thereto. In addition, this application is related to U.S. Pat. No. 5,934,744, the contents of which are also incorporated herein by reference thereto.

TECHNICAL FIELD

The present invention relates generally to vehicle structural systems, and more particularly to a structural attachment system having features for attaching components to one another within a vehicle, for providing reinforcement in load bearing areas of the components, and for allowing effective distribution of loads within the vehicle.

BACKGROUND OF THE INVENTION

Typically, a steering assembly of a vehicle includes a steering column extending between a steering mechanism, for example, a steering wheel, and a torque distribution mechanism. The steering column is designed to translate rotation of the steering wheel by a vehicle operator to the torque distribution mechanism which correspondingly positions the wheels of the vehicle in accordance with the position of the steering wheel, thus steering the vehicle.

It is desired that the steering column be of a sufficient compressive, shear, and torsional strength to endure the above described usage. The steering column designed as such can have a substantial mass and thus must be properly supported within the vehicle for effective functioning of the vehicle steering assembly.

Accordingly, the steering column is supported by attachment to a cross-car structural beam located within the vehicle. The load resulting from the weight of the steering column and other loads encountered during vehicle usage are distributed through the cross-car structural beam to side walls of the vehicle and/or to other parts of the vehicle where the cross-car structural beam is mounted thereto. The weight of the steering column is thereby conveyed, through the side walls and/or other vehicle parts, to a steel frame of the vehicle. Other parts of the vehicle which lend to the structural support system include, for example, an engine wall, a front-of-dash, etc.

The cross-car structural beam is generally a load-bearing member that is also used to support an instrument panel assembly and a heating ventilation and air conditioning (HVAC) structural duct system, both located about the beam. The structural beam further serves as a reaction surface for occupant protection devices such as air bags or knee bolsters.

The steering column is typically attached to the cross-car structural beam directly or by a steering column support structure. The steering column support structure is composed of a metal or a composite and is attached at a first end to the cross-car structural beam and at a second end to the steering column.

The steering column support structure must support the load of the steering column and other loads associated with vehicle usage and effectively distribute the loads to the cross-car structural beam for distribution to the side walls of the vehicle.

In addition to compensating for the various loads of the steering column, the steering column structural support must accommodate for a first natural frequency and the undesirable effects thereof. The first natural frequency is a vibratory level of the vehicle structural system which, when reached, can result in undesired vertical oscillatory displacement of the steering column within the vehicle.

The steering column structural support in combination with the cross-car structural beam are typically relied upon in vehicle structural systems to prevent the occurrence of such displacement. This is accomplished by designing the structural support and the structural beam to increase the first natural frequency beyond a level anticipated to be reached during various vehicle operating modes. Additional mass and materials are added to the structural support and structural beam in order to control the occurrence of the first natural frequency.

Where the steering column is directly coupled with the cross-car structural beam, the various loads and the first natural frequency must be accounted for by the means of direct attachment such as nuts, bolts, welding, etc.

Efficient load compensation and first natural frequency accommodation within the vehicle depends upon a proper attachment of the steering column to the cross-car structural beam.

Typically, the steering column structural support is mechanically attached at the first end to a load bearing area of the cross-car structural beam. The load bearing area is generally a portion of the cross-car structural beam and may be located, more specifically, at an underside of the beam. The steering column structural support is attached to the load bearing area by one or more threaded bolts and secured with fasteners such as nuts.

In the instance of direct attachment, where no steering column structural support is utilized, the steering column is typically directly attached to the load bearing area using one or more nut and bolt combinations.

The nut/bolt arrangement provides very localized points of attachment. The result is an inefficient transfer of the vehicle loads from the steering column to the cross-car structural beam and an insufficient attachment for accommodating the first natural frequency.

The load bearing area is often a part of the structural air duct. Light-weight air duct assemblies are composed of a molded plastic or a molded plastic composite and are mounted to the rigid cross-car structural beam. A metal-to-plastic interface between the nut/bolt arrangement and the air duct tends to degrade the plastic of the air duct. Hence, the overall attachment of the steering column and the cross-car structural beam is degraded. Thus, the use of extra parts, such as washers and the like, must be employed to preserve the plastic of the structural air duct.

The attachment of the steering column structural support and the cross-car structural beam using the nut/bolt arrangement must be performed manually and requires the handling of several parts and tools, thus valuable labor time is consumed and extra expense incurred.

Mechanical means of attachment, such as the nut/bolt arrangement, used in securing the steering column structural support to the cross-car structural beam constitute considerable localized mass within the vehicle. The mass of the mechanical attachment means must be compensated and accounted for in designing the vehicle and, particularly, the vehicle structural system.

Accordingly, it is desirable to have a structural attachment system for attaching a steering column to a cross-car structural beam that is light weight, simple to manufacture and assemble, provides an effective and efficient distribution of steering column loads, and prevents against occurrence of the first natural frequency.

SUMMARY OF THE INVENTION

According to the present invention, a structural attachment system is provided for attaching components to one another within a vehicle, for providing reinforcement in load bearing areas of the components, and for allowing effective distribution of loads within the vehicle.

The structural attachment system includes a first structural member and a vehicle component attached to one another by an attachment assembly.

In one exemplary embodiment of the present invention, the first and vehicle components are a structural air duct assembly and a steering column, respectively, and the attachment assembly is a steering column support unit.

The steering column support unit is a member which attaches the steering column to the structural air duct assembly at a load bearing area. The load bearing area is a portion of the structural air duct assembly which is subject to the steering column and the forces and loads associated therewith.

The steering column support unit includes mounting members for coupling with and supporting the steering column.

The steering column support unit also includes an attachment element for facilitating connection with the structural air duct assembly. The attachment element may be shaped and contoured to mate flush with the structural air duct assembly at the load bearing area.

The steering column support unit may be made of plastic or metal or any material sufficient for the purposes within the scope of the present invention.

The steering column support unit may be attached to the structural air duct assembly by any sufficient method including, but not limited to, mechanical attachment, chemical attachment, or thermal attachment (e.g., vibration or sonic welding), etc. Alternatively, the steering column support unit may be formed integrally with the structural air duct assembly by, for example, compression molding.

The steering column support unit may include reinforcing elements to provide added load bearing ability and rigidity to specified portions of the unit. The reinforcing elements include fibers disposed within the material forming steering column support unit. The fibers may be carbon. The fibers are selectively included in a binder used to form the steering column support unit. The binder may be the same as that used in the formation of the structural air duct assembly thus facilitating integral formation of the assembly and the steering column support unit.

In another exemplary embodiment of the structural attachment system of the present invention, the first structural member and vehicle components are the structural air duct assembly and the steering column, respectively, and the attachment assembly includes a load plate assembly and a steering column support unit.

The load plate assembly mechanically attaches the structural air duct assembly and the steering column support unit, the steering column support unit being coupled with the steering column.

In this embodiment, the load plate assembly is disposed within a plurality of structural ribs which are formed as part of the structural air duct assembly. The structural ribs provide a structure which disperses the load received by the load plate assembly due to the nesting thereof within the structural ribs.

The load plate is formed of a material which is designed to receive and transfer loads and forces associated with the steering column. Preferably, the load plate is formed of a metal.

The load plate assembly includes a plate member. The plate member is disposed within the structural air duct assembly at the ribs.

The plate member has a plurality of openings formed therein and a number of fastener members are formed above the plurality of openings. The fastener members are designed to engage and mate with an equal number of fasteners.

Fasteners extend through the steering column support unit and through the structural air duct assembly to mate with the fastener members. Fasteners provide secure attachment of the steering column support unit to the structural air duct assembly.

In another embodiment of the load plate assembly, the plate member does not have a number of fastener members formed as part thereof but rather has a number of fasteners which extend therefrom.

In this embodiment, fasteners are connected to a bottom surface of the load plate and extend therefrom. The load plate, again, is seated within the structural air duct assembly at the ribs. The fasteners extend from the structural air duct assembly and pass through the steering column support unit. The fastener members attach the steering column unit to the fasteners and hence the unit is mechanically attached to the structural air duct assembly by compression caused by the load bearing assembly.

The structural attachment system of the present invention, provides for the attachment of various vehicle components and distributes loads and forces associated with the components throughout the vehicle structural support system.

In one embodiment, the structural system utilizes a steering column support unit with to attach a steering column and a structural air duct assembly. In another embodiment, the structural system utilizes a load plate assembly in conjunction with a steering column support unit to attach the steering column to the structural air duct assembly.

The various embodiments of the present invention described attach and support the steering column, reinforce a load bearing area of the structural air duct assembly, regulate vertical oscillatory motion of the steering column, and distribute the loads of the steering column across the structural air duct assembly and elsewhere throughout the vehicle.

The structural attachment system of the present invention provides for a vehicle structural system of reduced mass. Particularly, light-weight materials such as plastic may be used to form the vehicle components due to the added support and rigidity provided at the load bearing area by the steering column unit and/or the load plate.

The assembly described herein reduces extra parts need for assembly and provides a simplistic design allowing for ease of installation.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
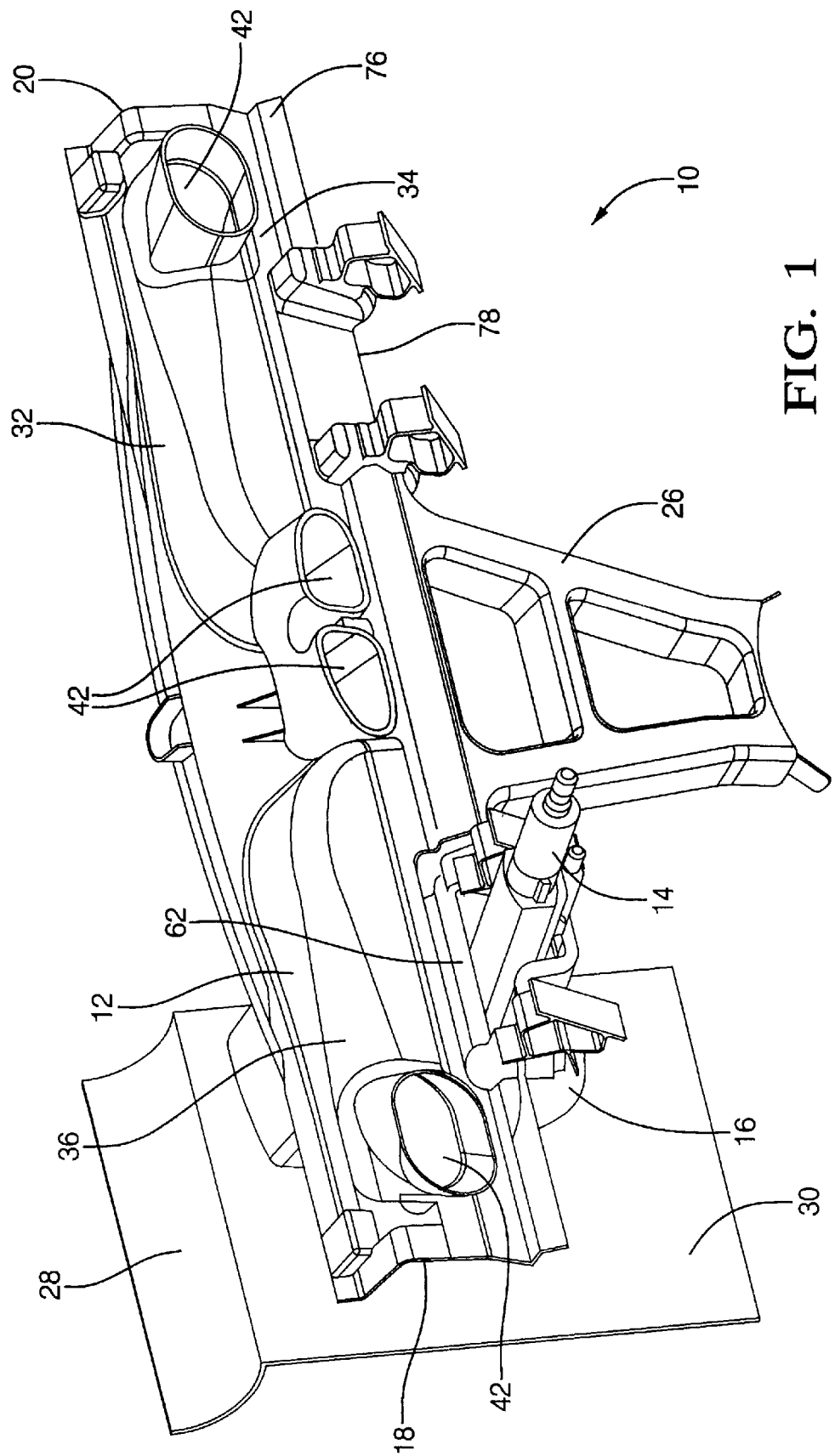
FIG. 1 is a perspective view of a structural attachment system of the present invention.

FIG. 1 illustrates a front perspective view of structural support system 10 in one embodiment of the present invention.

Structural support system 10 is located within a vehicle. Structural support system includes a first structural member 12 and a vehicle component 14. First structural member and vehicle component 12 and 14 are disposed adjacent one another.

Structural support system 10 also includes an attachment assembly 16 positioned relative to first structural member and vehicle component 12 and 14. Attachment assembly 16 attaches first structural member and vehicle component 12 and 14 and facilitates the distribution of loads of vehicle component 14 across first structural member 12.

Referring now to FIGS. 1–4, first structural member 12 is a structural air duct assembly. Structural air duct assembly 12 includes opposing ends 18 and 20. Structural air duct assembly 12 is attached to side walls 22 of the vehicle. Side walls 22 are mounted atop a vehicle floor 24 of the vehicle. Structural air duct assembly 12 is supported by a center brace 26 which extends from structural air duct assembly 12 to vehicle floor 24. Structural air duct assembly 12 is also supported by a plenum 28 and an engine wall 30 (see FIGS. 11 and 14).

Structural air duct assembly 12 is formed of at least several sections including a first section 32 and a second section 34. First and second sections 32 and 34 are complementary in nature so as to permit the two to mate with each other to form structural air duct assembly 12. Second section 34 comprises a lower base section. First section 32 comprises an upper section. First and second sections 32 and 34 are mated to one another to form structural air duct assembly 12. First and second sections 32 and 34 can be connected at one end by a living hinge about which first and second sections 32 and 34 are rotated into a mated position, thus forming structural air duct assembly 12.

Second section 34 includes a first surface 76 and an opposing second surface 78. First surface 76 contacts first section 32 when first and second sections 32 and 34 are mated to form structural air duct assembly 12.

First and second sections 32 and 34 may be secured to one another by any number of techniques including using a vibration welding process in which first and second sections 32 and 34 are attached to one another at selected points.

When first and second sections 32 and 34 mate with each other, one or more duct passageways 36 are formed. Duct passageways 36 carry and direct air to predetermined locations within a vehicle passenger compartment.

Structural air duct assembly 12 is coupled to a heating, ventilating, and air conditioning (HVAC) module 38. HVAC module 38 is disposed within the vehicle in fluid communication with structural air duct assembly 12. HVAC module 38 includes a hollow housing within which are contained heat exchangers and various airflow directing devices. HVAC module 38 receives air from an upstream blower unit and adjusts the temperature of this air before redirecting and delivering the tempered air to structural air duct assembly 12 through which the air passes to the passenger compartment. HVAC module 38 accordingly tempers the air by use of a reheat and air mix assembly composed of various heat exchangers disposed within the housing.

First and second sections 32 and 34 contain an HVAC opening 40. HVAC opening 40 is designed to communicate with HVAC module 38 so as to receive the tempered air therefrom. First and second sections 32 and 34 further include a plurality of vent openings 42 formed therein at a variety of locations to facilitate distribution of the tempered air. For example, some of openings 42 may be located proximate to a vehicle windshield to promote defogging and defrosting of the windshield. Further, some of the openings 42 may be located proximate to a vehicle floor of the passenger compartment and are typically used as heater outlets. Additionally, openings 42 are formed at mid-height relative to the windshield and floor openings and are generally designed as air-conditioning or cooling outlets.

Structural air duct assembly 12 may be composed of any material sufficient for purposes within the scope of the present invention including, but not limited to, molded plastic and cast metal or a combination thereof.

Structural air duct assembly 12 is generally a load bearing and load distributing assembly. Structural air duct assembly 12 includes a load bearing surface 62 where loads of various vehicle components are various applied.

Referring now to FIGS. 1–8, vehicle component 14, in the present exemplary embodiment, is a steering column. Steering column 14 is attached to structural air duct 12 by attachment assembly 16.

Attachment assembly 16 includes a steering column support unit 44. Steering column support unit 44 includes a front portion 46 and an opposing rear portion 48. Steering column support unit also includes sides 50. An attachment element 52 extends from front portion 46 to rear portion 48. Front and rear portions 46 and 48, sides 50, and attachment element 52 form a support unit cavity 54 at an interior of steering column support unit 44.

Steering column support unit 44 also includes a bottom portion 56 formed opposite attachment element 52. Bottom portion 56 is open, thus support unit cavity 54 is exposed.

Rear portion 48 includes a steering column opening 58 formed therein to receive steering column 14,into support unit cavity 54. Rear portion 48 also includes knee bolsters 55 coupled thereto.

Front and rear portions 46 and 48 are positioned to allow extension of steering column 14 through steering column support unit 44. For example, front portion 46 may be positioned at a point above rear portion 48 within the vehicle such that steering column 14 may by received at opening 58 and extend through support unit cavity 54, out bottom portion 56, and beyond steering column support unit 44. Alternatively, front portion 46 may be angled relative to rear portion 48 thus allowing extension of steering column 14 through steering column support unit 44 as described.

Attachment element 52 is a contoured surface which generally has a shape formed to facilitate attachment with structural air duct 12. Attachment element 52 may be shaped to mate flush against a portion of structural air duct 12.

Steering column support unit may be formed of any substance sufficient for purposes within the scope of the present invention. For example, steering column support unit 44 may be formed of a metal such as steel or magnesium, or unit 44 may be formed of a plastic or a plastic/metal composition.

Alternatively, steering column support unit 44 may be formed of a composite fiber. The binder for this fiber is a similar and compatible material to the material used in forming structural air duct assembly 12. This similarity of materials allows for direct integration of steering column support unit 44 to structural air duct assembly 12. Thus, steering column support unit 44 may be molded as a part of structural air duct assembly 12. The structural properties of the fiber add to the performance of structural system 10 by providing a discrete localized fiber reinforcement zone.

Steering column support unit 44 is attached at attachment element 52 to load bearing area 62 of structural air duct assembly 12 by, for example, mechanical, thermal, or chemical attachment methods. Further, steering column support unit 44 may be integrally formed with structural air duct assembly 12.

Steering column support unit 44 composed of metal is mechanically fastened to structural air duct 12. Steering column support unit 44 composed of metal may be formed by stamping, casting, etc.

Steering column support unit 44 composed of plastic may be formed individually in a molding process and then attached to structural air duct 12. Such attachment may be accomplished by a chemical means, for example glue, or by thermal means, for example welding. Welding techniques used to attach steering column support unit 44 and structural air duct 12 include vibration and sonic welding.

Alternatively, steering column support unit 44 composed of plastic may be formed integrally with structural air duct assembly 12. That is, steering column support unit 44 and structural air duct assembly 12 may be molded integral to one another during the molding process.

Attachment element 52 provides a surface by which structural air duct 12 and steering column support unit 44 are attached. Where steering column support unit 44 is composed of metal, the unit is coupled by mechanical means to structural air duct assembly 12 at attachment element 52. Where steering column support unit 44 is composed of plastic, the unit is coupled to structural air duct assembly 12 by welding or integral molding at attachment element 52.

As mentioned, attachment element 52 is shaped to correspondingly mate with structural air duct assembly 12. Attachment element 52 transfers loads associated with steering column 14 to structural air duct assembly 12 and regulates and controls vertical oscillatory motion thereof.

Steering column support unit 44 may be selectively reinforced to effectively and efficiently attach to, and bear loads associated with attachment to, structural air duct assembly 12 and steering column 14. Particularly, attachment element 52 and/or the load bearing area 62 may be reinforced. Reinforcement may be provided homogenously or in selected regions.

Figure 5A:
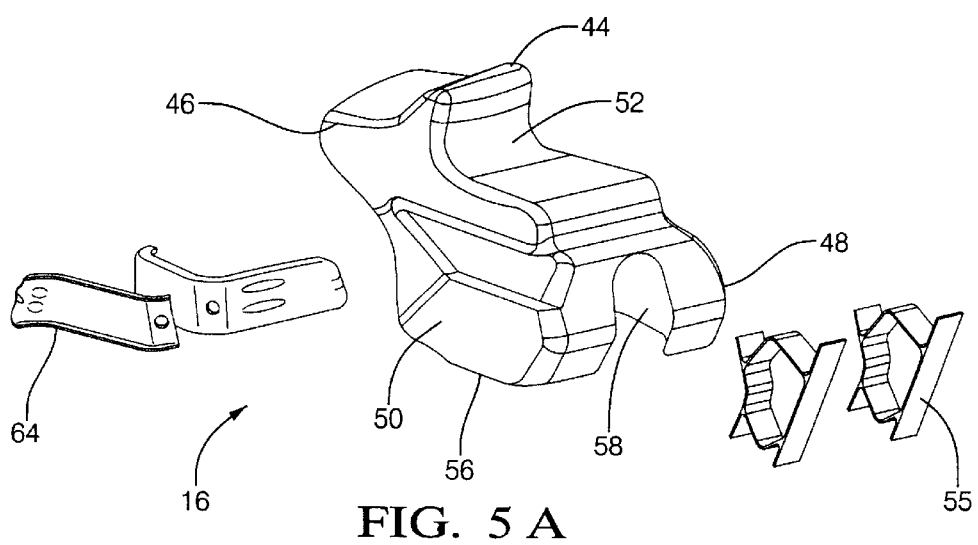
FIG. 5A is an exploded perspective view of an attachment assembly of the present invention.
Figure 5:
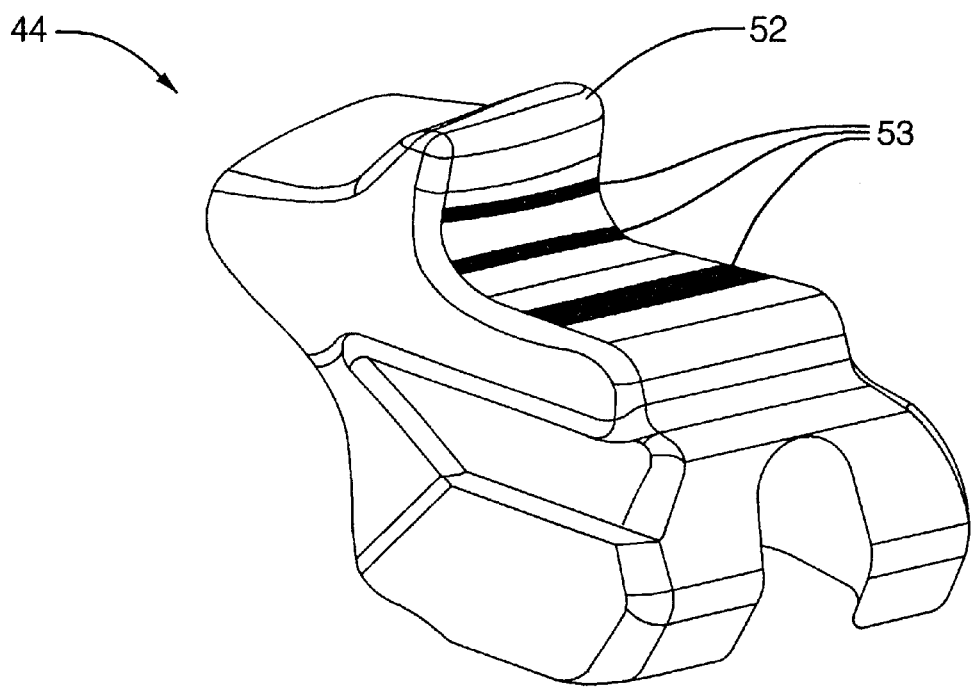
FIG. 5B is a steering column support unit in one embodiment of the present invention.
FIG. 5C is the steering column support unit of FIG. 5B in another embodiment of the present invention.
FIG. 5D is the structural air duct assembly of FIGS. 1–3 in another embodiment of the present invention.
FIG. 5E is the structural air duct assembly of FIGS. 1–3 in another embodiment of the present invention.
Figure 5:
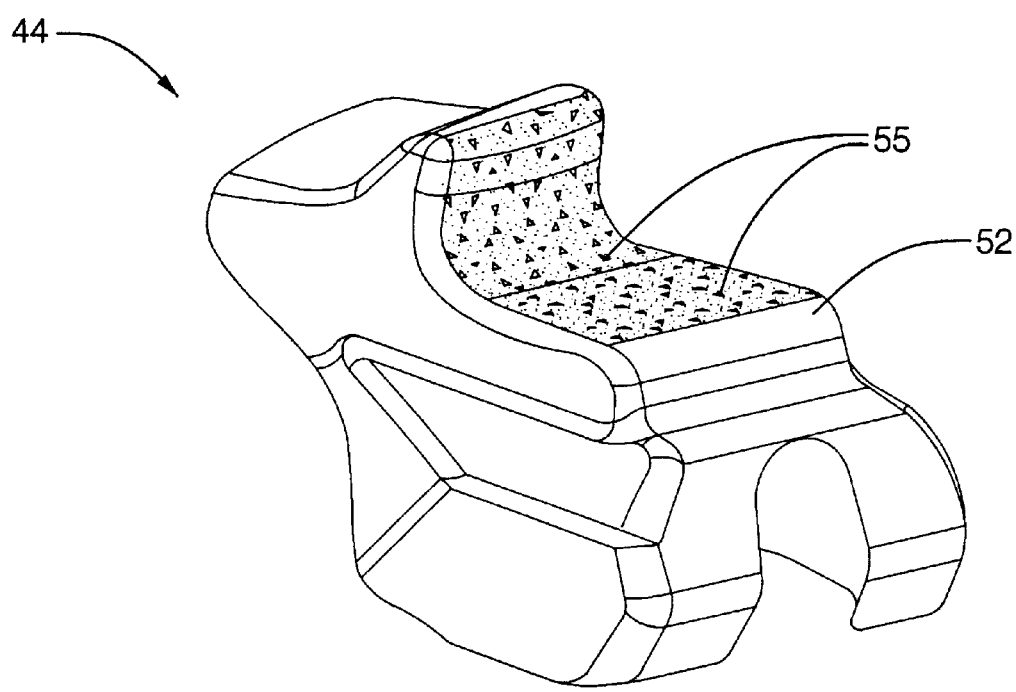
Figure 5:
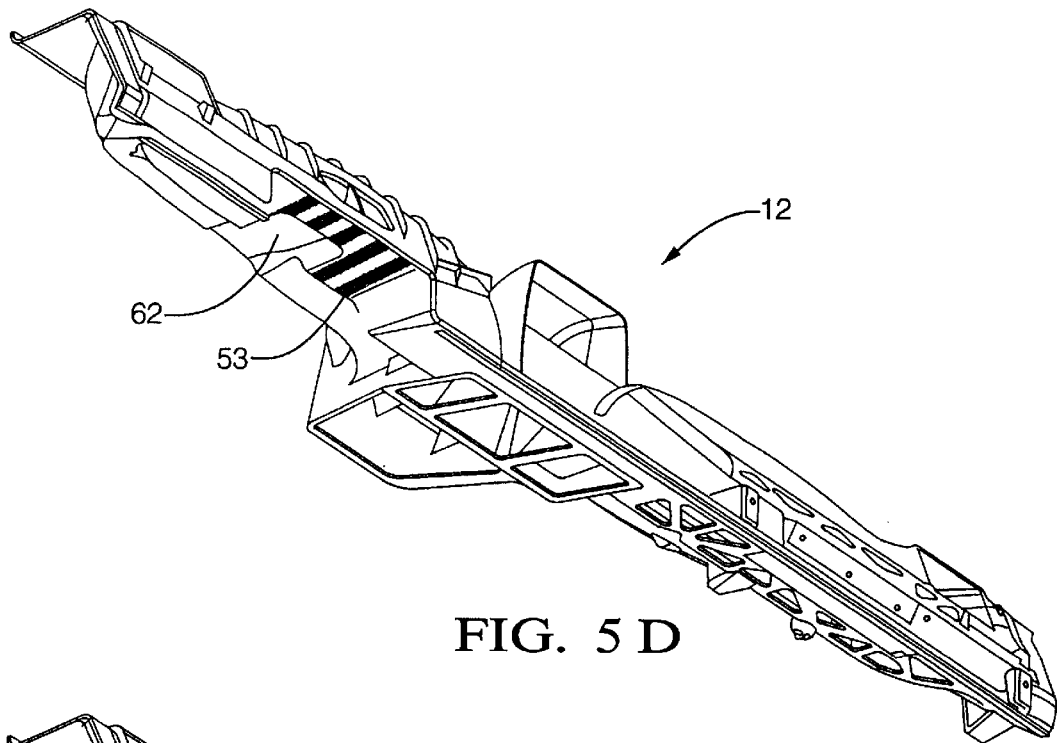
Figure 5:
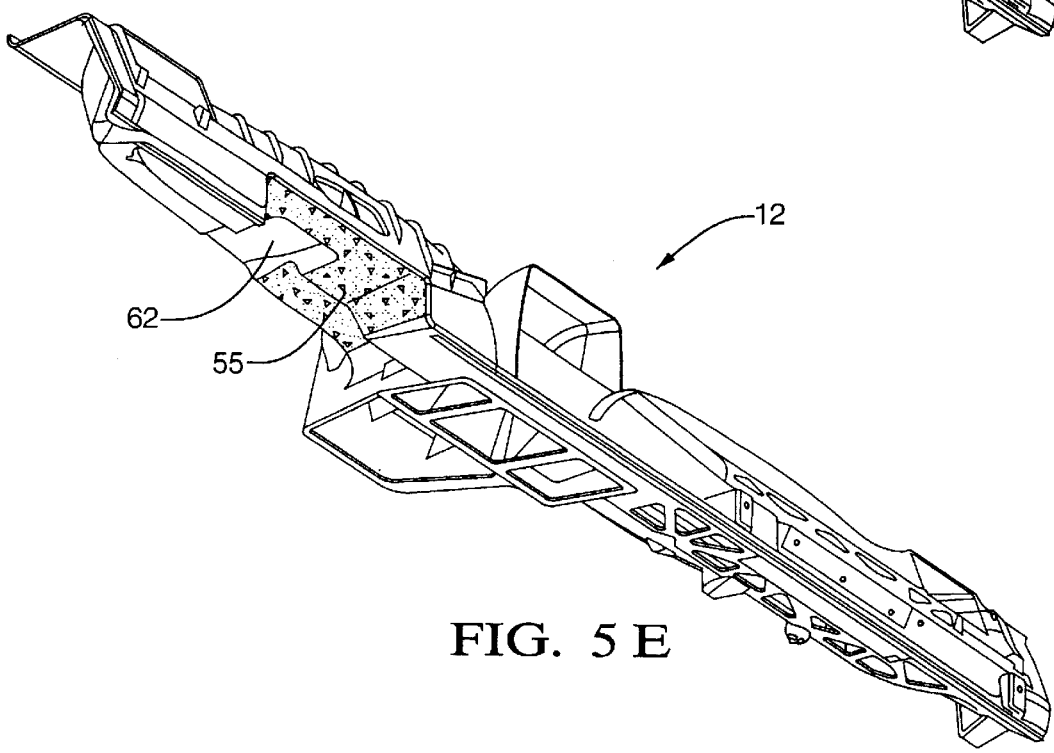
Figure 6:
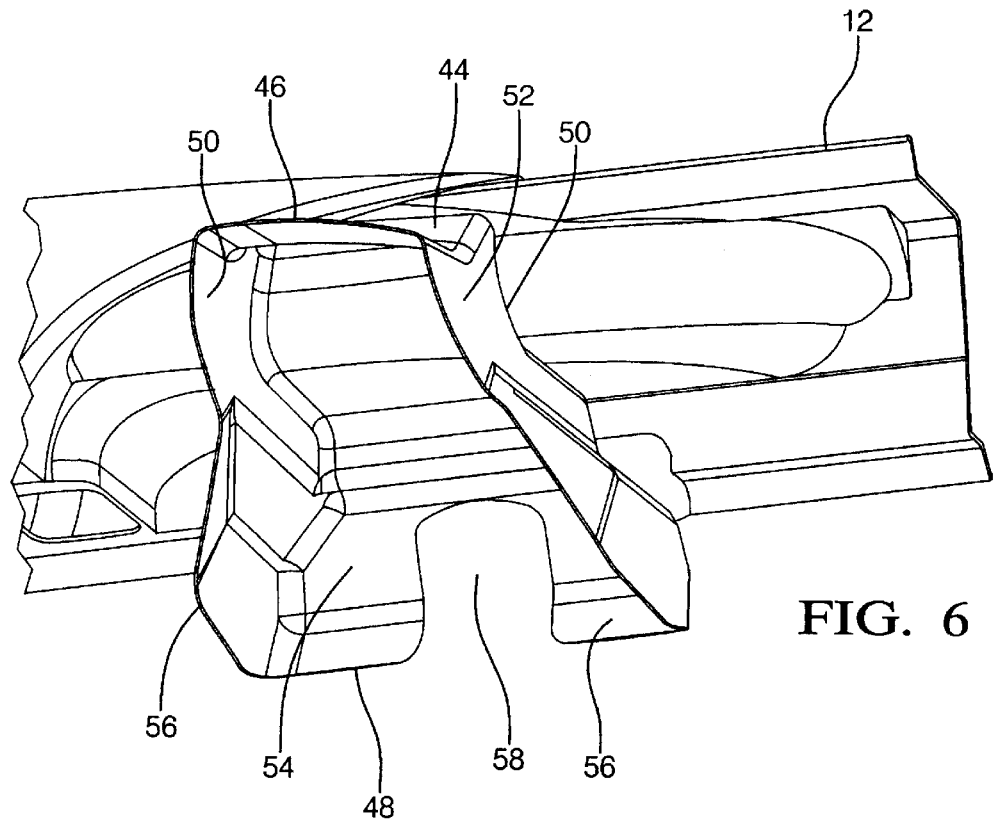
FIG. 6 is a perspective view of a steering column support unit coupled with a structural air duct assembly.

Steering column support unit 44 composed of metal may include reinforcement members 53 (see, particularly, FIG. 5B). Reinforcement members 53 are bars or plates and may be formed of any material, for example metal, sufficient to provide desired reinforcement properties. Additionally, steering column support unit 44 composed of metal may include areas of reinforcement defined by selected portions of unit 44 having increased density or a larger volume relative to the metal formed in other, non-reinforcement areas of unit 44.

Steering column support unit 44 composed of plastic may include reinforcing elements 55 located in selective reinforcement areas (see FIG. 5C). Reinforcing elements 55 are fibers, for example, carbon fibers, formed in the plastic during the molding process. Fibers are molded in plastic steering column support unit 44 using a binding agent which is the same or similar to a binding agent used in forming the structural air duct assembly 12. In this way, attachment of steering column support unit 44 to structural air duct 12 through welding or integral molding is facilitated.

Selective reinforcement of attachment element 52 provides reinforcement to a load-bearing area 62 of structural air duct 12. Load bearing area 62 also may include reinforcing members and elements 53,55 (see FIGS. 5D and 5E).

As mentioned, load bearing area 62 is located at a point where steering column support unit 44 is attached to structural air duct assembly 12. Specifically, load bearing area 62 is located at second section 34 on an underside of structural air duct 12. Load bearing area 62 receives loads of steering column 14 and transfers the loads across and throughout structural air duct assembly 12.

Reinforcement of attachment element 52 ensures an efficient and effective attachment of steering column support unit 44 to structural air duct assembly 12. Also, reinforcement of attachment element 52 provides discrete localized structural reinforcement within structural support system 10 which facilitates the support and distribution of steering column loads throughout support system 10.

Figure 7:
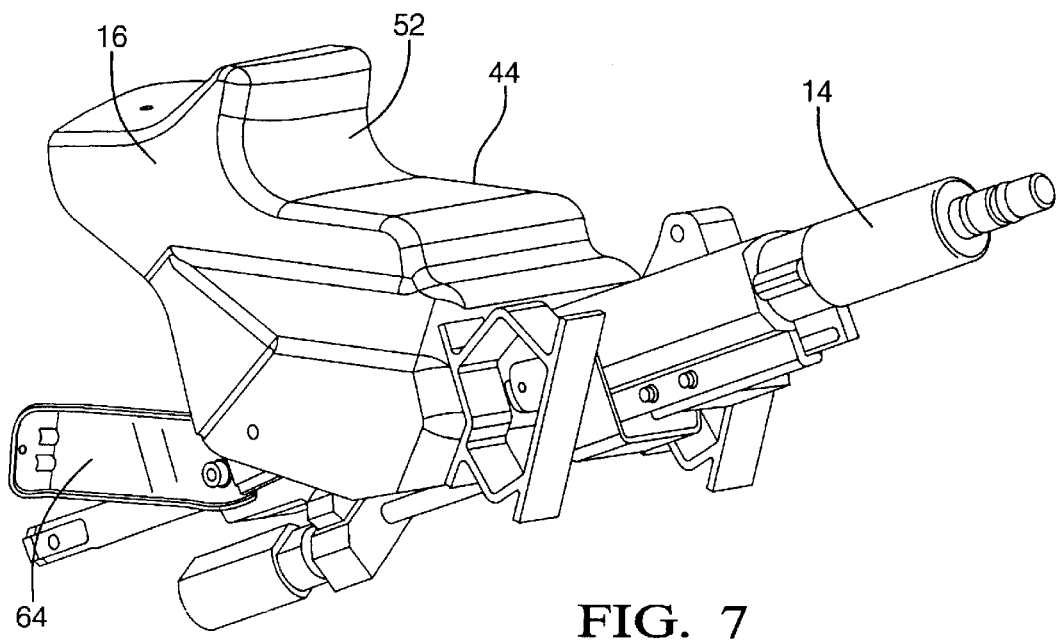
FIG. 7 is a perspective view of the attachment assembly of FIG. 5 coupled with a steering column.
Figure 8:
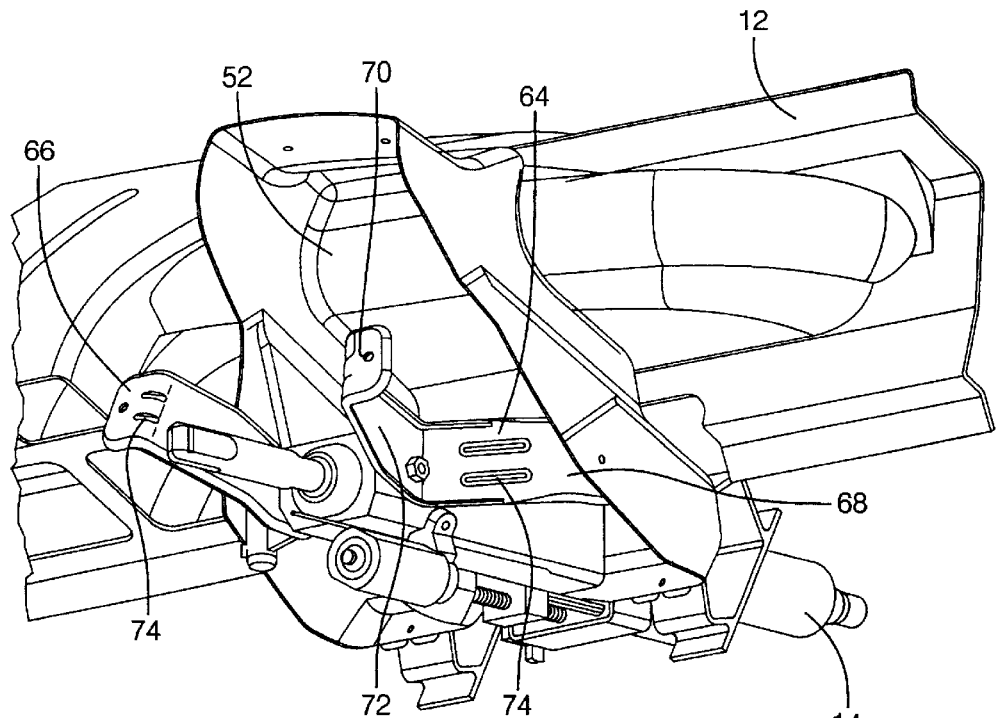
FIG. 8 is another view of the structural attachment system of FIG. 1.

Attachment assembly 16 further includes mounting members 64 (FIGS. 7 and 8). Mounting members 64 provide for the securement of steering column 14 to steering column support unit 44.

Mounting members 64 are generally plate-like members and each include a front portion 66 and a rear portion 68. Front portion 66 and rear portion 68 are designed to couple with engine wall 30 and steering column support unit 44, respectively, when mounting members 64 are installed in the vehicle. Particularly, front and rear portions 66 and 68 include mounting holes 70 through which a bolt/nut assembly may be passed to secure mounting members 64 within structural support system 10. Alternatively, front and rear portions 66 and 68 may be welded to or integrally formed within structural support system 10.

Mounting members 64 each also include a steering column portion 72. Steering column portion 72 extends between front and rear portions 66 and 68. Mounting members 64 are attached to steering column 14 at steering column portion 72. Specifically, steering column portion 72 may include mounting holes 70 to facilitate mechanical attachment of mounting members 64 to steering column 14. Alternatively, steering column portion 72 may coupled with steering column 14 by chemical attachment, for example glue, or by welding, or by any form of integral attachment or otherwise such that steering column 14 is securely attached to mounting members 64.

Steering column portion 72 may be shaped and contoured to best transfer and distribute various loads of steering column 14 within structural support system 10. Specifically, steering column portion 72 may be shaped to effectively distribute steering column loads to engine wall 30 and to steering column support unit 44. Steering column portion 72 may include apertures 74 variously formed therein to reduce mass of mounting members 64 while preserving structural integrity thereof.

In FIG. 8, two mounting members 64 are secured at steering column portions 72 with nut/bolt assemblies to opposing sides of steering column 14. Rear portions 68 extend through bottom portion 56 into support unit cavity 54 of steering column support unit 44. Therein, rear portions 68 are coupled to sides 50. Steering column support unit 44 is attached to load bearing area 62 of structural air duct assembly 12.

Steering column 14 imparts a load upon mounting members 64. The load may act in any direction or in various directions, particularly during vehicle operation. The load is transferred through mounting members 64 to front and rear portions 66 and 68. The load is distributed to engine wall 30 at front portions 66 and to steering column support unit 44 at rear portions 68. The load directed to engine wall 30 is variously distributed to the structural system of the vehicle including vehicle floor 24.

Figure 2:
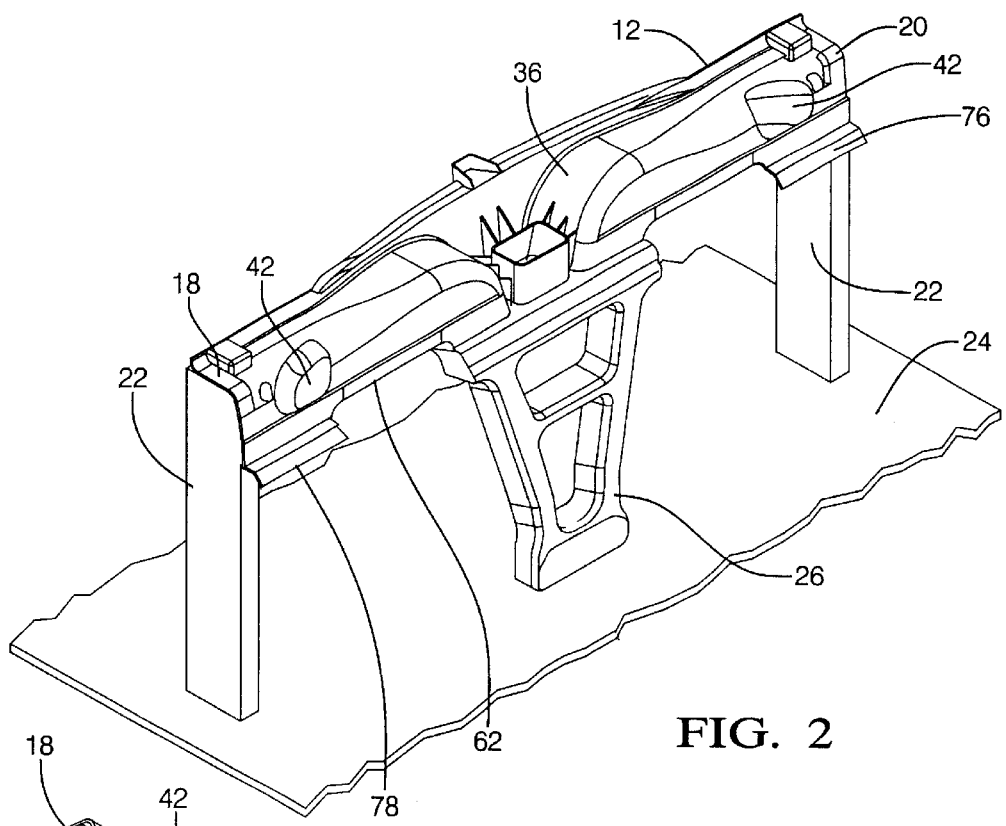
FIG. 2 is a perspective view of a structural air duct assembly.
Figure 3:
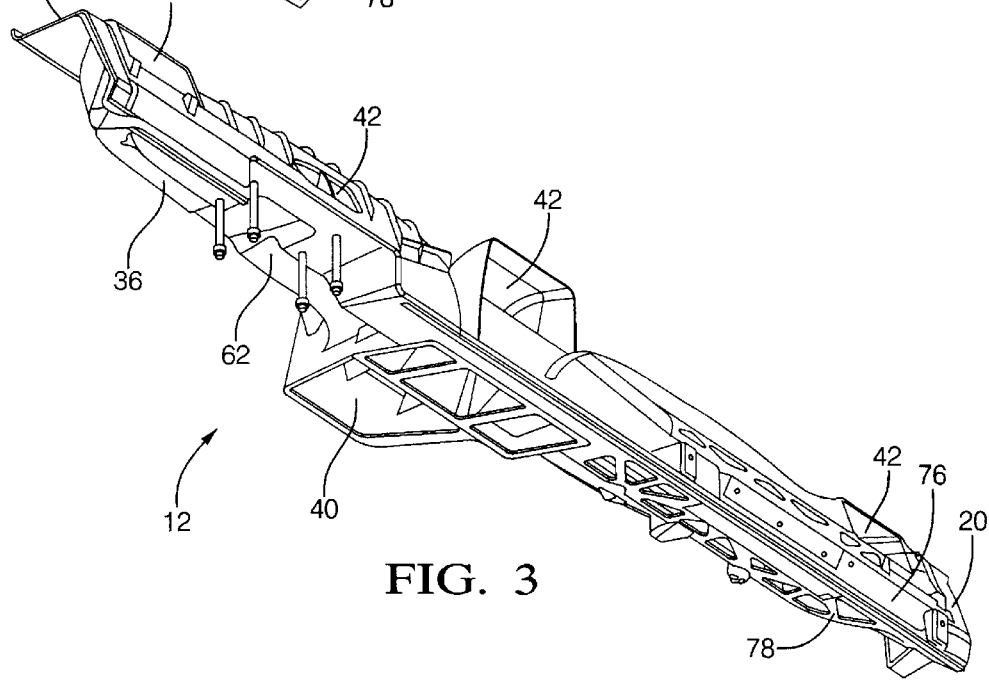
FIG. 3 is another perspective view of the structural air duct assembly of FIG. 2.
Figure 4:
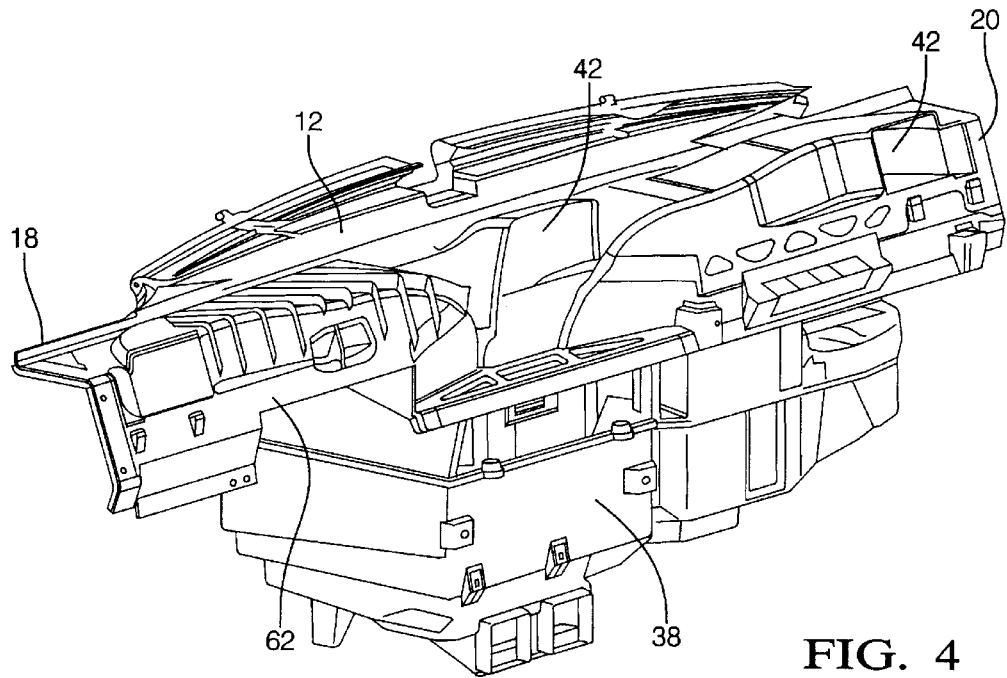
FIG. 4 is a perspective view of a structural air duct assembly of FIG. 2 with an HVAC module attached thereto.

The load is directed toward steering column support unit 44 is transferred through attachment element 52 to load bearing area 62 and across structural air duct assembly 12 of FIGS. 1–3. Structural air duct 12 distributes the load in part to side walls 22 and in part to plenum 28. Ultimately, the load directed to structural air duct assembly 12 is distributed to the structural system of the vehicle including vehicle floor 24.

Steering column 14 can also attain a first natural frequency which can result in vertical oscillatory motion of steering column 14. Structural support system 10 regulates the occurrence of the first natural frequency and controls resulting vertical oscillatory motion.

Referring now to FIGS. 9–14, an alternative embodiment of the present invention is illustrated. Herein, component parts performing similar or analogous functions are labeled in multiples of 100.

In the present embodiment, structural attachment system 110 includes a first structural member 112, preferably a structural air duct assembly, and a vehicle component 114, preferably a steering column.

Structural attachment system 110 further includes an attachment assembly 116. Attachment assembly 116 includes a steering column unit 200 and a load plate assembly 202.

Figure 10:
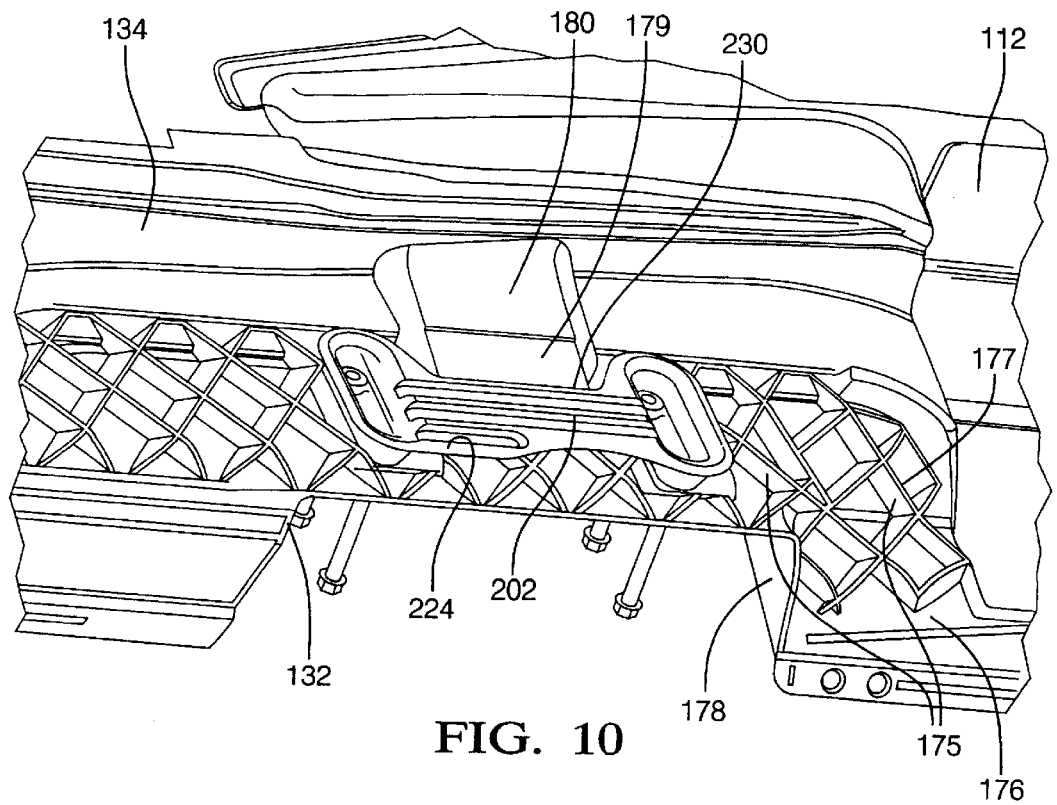
FIG. 10 is perspective view of the load plate assembly of FIG. 9 coupled with a structural air duct assembly.

FIG. 10 is an enlarged view of second section 134 of first structural member 112 with load plate assembly 202 disposed therein.

Second section 134 includes a first surface 176 and an opposing second surface 178. First surface 176 faces first section 132 of structural air duct assembly 112 when first and second sections 132 and 134 are mated with each other.

Second surface 178 comprises a generally smooth surface while first surface 176 comprises a contoured surface. More specifically, first surface 176 has a plurality of structural ribs 175 which are arranged on first surface 176 to form a predetermined rib pattern.

Structural ribs 175 protrude away from first surface 176 so as to form a raised contoured topography of first surface 176. Structural ribs 175 are arranged in a pattern. For example, structural ribs 175 may be arranged in an "X" shaped pattern, a "V" pattern, etc. on at least a portion of first surface 176.

Structural ribs 175 are integrally formed as part of second section 134 of structural air duct assembly 112. Structural ribs 175 are formed slightly angled relative to first surface 176. Of course, however, some or all of structural ribs 175 may be formed substantially perpendicular to first surface 176. Structural ribs 175 include upper edges 177 which are located distal first surface 176.

Structural ribs 175 are designed to transfer a load across second section 134 and more generally across structural air duct assembly 112, which in this case includes structural air duct assembly 112, specifically first and second sections 132 and 134.

Accordingly, it is desirable to have increased structural rigidity in select, predetermined portions of second section 134. Structural ribs 175 serve to provide an area of increased rigidity and an area which can receive and transfer loads so that loads are not acting in isolation in one particular area of structural air duct assembly 112.

It will be understood that the described rib structure 175 is merely exemplary in nature and any number of rib structures may be used in the present invention.

Second section 134 further includes a stepped platform 179 having a planar upper surface 180. Stepped platform 179 is formed and orientated so that structural ribs 175 surround at least a portion of stepped platform 179. Planar upper surface 180 is smooth in nature.

Typically, the structural air duct assembly 112 is formed of a suitable plastic material which provides the desired characteristics described hereinbefore.

Figure 9:
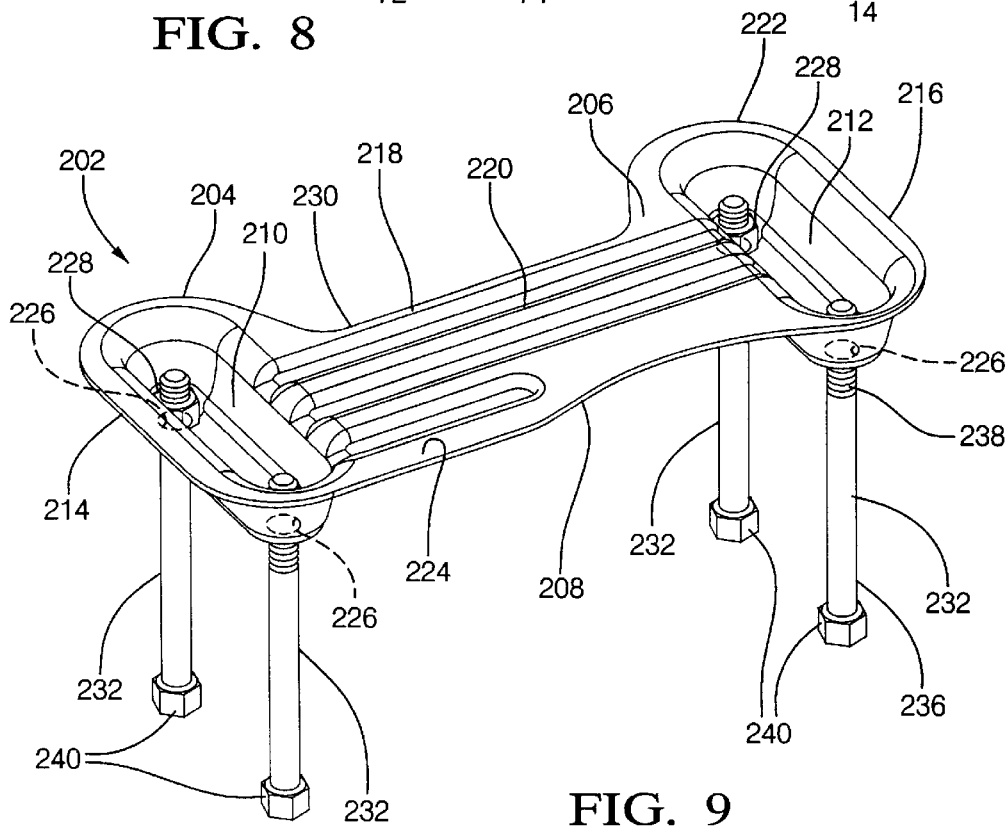
FIG. 9 is a perspective view of a load plate assembly in one embodiment of the present invention.
Figure 11:
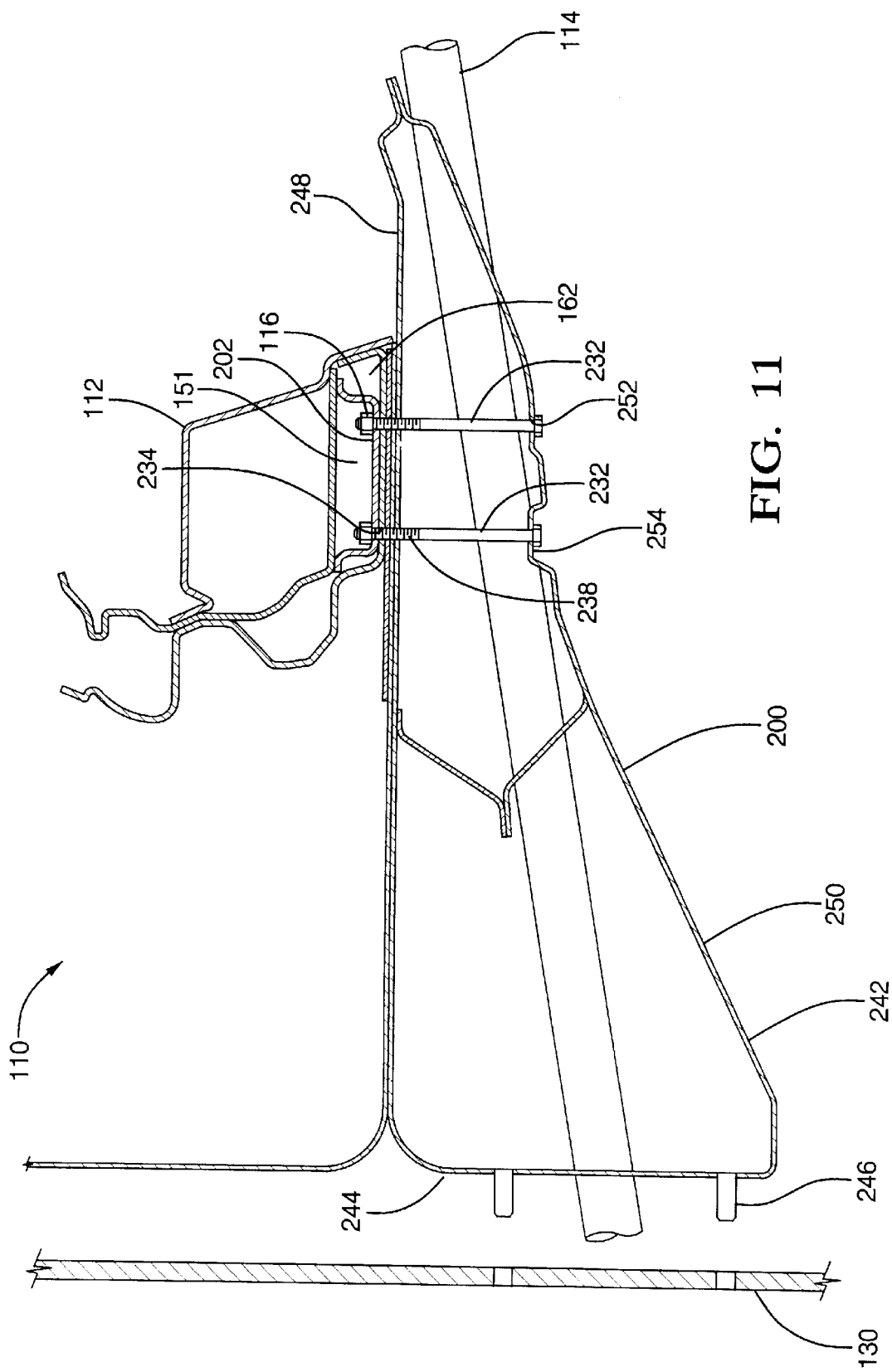
FIG. 11 is a cross sectional view of a structural attachment system in another embodiment of the present invention.

Reference is now made generally to FIGS. 9–11 and particularly to FIG. 9.

Load plate assembly 202 is generally a plate-like structure designed and oriented to effectively receive and disperse loads of steering column 114. Load plate assembly 202 includes a plate member 204. Plate member 204 includes a first surface 206 and an opposing second surface 208. Second surface 208 faces and seats against first surface 176 of second section 134. Conversely, first surface 206 faces first section 132 of structural air duct assembly 112.

Plate member 204 includes a first recessed section 210 and an opposing second recessed section 212. First recessed section 210 forms a first cavity at a first end 214. Second recessed section 212 forms a second cavity at an opposing second end 216.

Between first and second recessed sections 210 and 212, a platform 218 extends so as to connect first and second recessed sections 210 and 212 relative to one another. First and second recessed sections 210 and 212 preferably have a width greater than a width of platform 218 so that a central portion of plate member 204 is narrower than the end portions thereof. Preferably, an upper surface 220 of platform 218 lies in the same plane as upper edges 222 of first and second recessed sections 210 and 212 at first and second ends 214, 216, respectively.

Each of first and second recessed sections 210 and 212 is designed to fit between structural ribs 175 so that first and second recessed sections 210 and 212 seat within and between structural ribs 175. First and second recessed sections 210 and 212 are thus shaped complementary to the shape of structural ribs 175 so that first and second recessed sections 210 and 212 seat between structural ribs 175 and lie flush against first surface 176. In this seated position, a perimetric rim 224 of load plate member 204 extends above upper edges 177 of structural ribs 175.

Plate member 204 further includes a predetermined number of fastener openings 226 formed therein. Particularly, openings 226 are formed in first and second recessed sections 210 and 212.

Fastening members 228 are provided corresponding to each opening 226. Fastening members 228 are, for example, threaded nuts. Nuts 228 are positioned over the openings 226 so that an opening formed in each nut 228 is axially aligned with one opening 226. Nuts 228 are preferably coupled to first surface 206 of plate member 204 by any number of conventional techniques including welding. Plate member 204 with nuts 228 secured thereto serves as an attachment plate to which another component may be attached.

Plate member 204 is formed of a material which is designed to effectively receive and disperse loads. Plate member 204, for example, is formed of metal, and more particularly, steel.

It will be appreciated that the shape and size of plate member 204 may vary. It will also be appreciated that plate member 204 will be formed in view of the shape of structural air duct assembly 112 and more particularly the shape of second section 134 in which plate member 204 is seated.

Plate member 204 additionally includes a rear edge 230. Rear edge 230 is designed to accommodate stepped platform 179 of second section 134. In this way, plate member 204 is disposed over stepped platform 179. More specifically, rear edge 230 is disposed above stepped platform 179. Stepped platform 179 therefore is designed so that a height thereof does not interfere with plate member 204 seating against first surface 176 of second section 134.

Load plate assembly 202 also includes a predetermined number of studs 232. Studs 232 are threadingly received within nuts 228. Studs 232 have complementary threads as to nuts 228. Thus, studs 232 are designed to threadingly mate with nuts 228 so that studs 232 may be securely coupled to plate member 204.

It will be appreciated that the number of studs 232 is equal to the number of nuts 228. It will further be appreciated that second section 134 will have an equal number of openings 234 formed therein for receiving studs 232 as they pass through second section 134 and threadingly engage nuts 228.

Each stud 232 has a non-threaded end 236 located opposite to a threaded end 238. Each threaded end 238 is received within and threadingly mates with one nut 228. Non-threaded ends 236 include heads 240 formed thereon which are generally for connecting studs 232 to any of a plurality of vehicle components as will be discussed further herein.

In the present embodiment, plate member 204 is seated within second section 134 of structural air duct assembly 112 atop first surface 176. That is, first surface 176 is disposed between plate member 204 and end 236 of studs 232. Ends 236 extend toward and are received and retained within a vehicle component, attaching the vehicle component to structural air duct assembly 112.

In an exemplary embodiment of structural attachment system 110, as that depicted in FIG. 11, load plate assembly 202 attaches steering column support unit 200 to structural air duct assembly 112. Plate member 204 is seated in structural air duct assembly 112 with studs 232 extending therefrom and being received by steering column structural support unit 200 such that structural air duct assembly 112 and support unit 200 are attached by load plate assembly 202.

Steering column support unit 200 includes a steering column support member 242 and a steering column extension bracket portion 244 coupled thereto.

Steering column extension bracket portion 244 has a number of posts 246 which serve to attach steering column support unit 200 to engine wall 130 of the vehicle.

Steering column support member 242 is coupled to steering column extension bracket portion 244 and is designed to support and locate a steering column. Steering column support member 242 has a first surface 248 and an opposing second surface 250. First surface 248 faces structural air duct assembly 112. Second surface 250 faces away from structural air duct assembly 11?. First surface 248 is designed so that at least a portion thereof has a complementary shape as second section 134 to permit second section 134 to be disposed on first surface 248 and lie flush thereagainst.

The steering column support member 242 further includes a number of steering column support openings 252 formed therein. More specifically, openings 252 are formed in both first surface 248 and second surface 250. One opening 252 which is formed in first surface 248 is axially aligned with another opening 252 formed in second surface 250. Openings 252 are sized and formed in steering column support member 242 at select locations so that studs 232 may be disposed through openings 252.

Studs 232 are inserted through openings 252 formed in second surface 250. Studs extend through the body of steering column support member 242 before exiting through openings 252 formed in first surface 248. Threaded ends 238 are passed through steering column support member 242 and extend therefrom to threadably engage nuts 228. Non-threaded ends 236 remain adjacent second surface 250. Specifically, heads 240 lie flush against second surface 250.

Thus, non-threaded ends 236 provide a driving portion where studs 232 can be driven so as to attach steering column support unit 200 with structural air duct assembly 112.

Second surface 250 includes planar sections 254 at least at locations where openings 252 are formed. This permits non-threaded ends 236 of the studs 232 to seat flush against second surface 250.

As shown in FIG. 10, plate member 204 is disposed in second section 134 of structural air duct assembly 112.

A structural duct cavity 151 is formed within structural air duct assembly 112 when first and second sections 132 and 134 are coupled to one another. Load plate 204 is nested within structural ribs 175 formed in second section 134. Structural duct cavity 151 is of sufficient size to receive plate member 204. It will thus be appreciated that plate member 204 is essentially and conveniently hidden within structural air duct assembly 112.

Load plate assembly 202 serves to attach steering column support unit 200 to structural air duct assembly 112 by threadingly engaging studs 232 with nuts 228 while steering column support member 242 and second section 134 of structural air duct assembly 112 are disposed between stud ends 236 and plate member 204. As studs 232 are driven at ends 236 thereof, studs 232 threadingly engage and travel within nuts 228 so as to compress steering column support member 242 and second section 134 relative to one another. This results in stress being generated between two components and this stress is particularly isolated at the point of attachment between the two components.

Steering column support unit 200 is typically formed of metal and is attached to load bearing area 162 of structural air duct assembly 112. Thus, steering column support unit 200 results in a significant load being applied to structural air duct assembly 112.

Plate member 204 and the formation of structural ribs 175 within second section 134 allow for metal to be used to reinforce load bearing area 162. That is, structural air duct assembly 112 may be formed of a plastic material which minimizes the mass of the entire cross car assembly.

The use of load plate assembly 202 and structural ribs 175 according to the present invention provides the desired fastener retention where needed at the point of attachment between steering column support unit 200 and structural air duct assembly 112. Load plate assembly 202 acts to reinforce the acting load of the steering column and steering column support unit 200 and directs this load to structural air duct assembly 112. The nesting of plate member 204 within the plurality of structural ribs 175 permits the load to be dispersed across the cross car structural air duct assembly 112 efficiently and effectively.

Load plate assembly 202, in combination with the plurality of structural ribs 175, provides a load bearing and structural attachment system which acts to receive a significant load at a point of attachment between two vehicle components, i.e., structural air duct assembly 112 and steering column support unit 200. Load plate assembly 202 also disperses the load over the structural air duct assembly. Therefore the loads associated with steering column support unit 200 and steering column 114 are distributed effectively so that stresses at the point of attachment do not become excessive and do not threaten the integrity of the localized attachment or the overall vehicle structural support system.

Load plate assembly 202 and steering column support unit 200 also control occurrence of the first natural frequency and control resulting vertical oscillatory motion.

Load plate assembly 202 is composed of a metal, for example, and more particularly a light-weight metal. Nuts 228 are fixably attached to plate member 204 for reception and retention of studs 232. Plate member 204 is seated in second section 134 of structural air duct assembly 112 and engaged therein by structural ribs 175. Accordingly, load plate assembly 202 is readily assembled and installed, requiring minimal use of tools and involving no extra parts.

Figure 12:
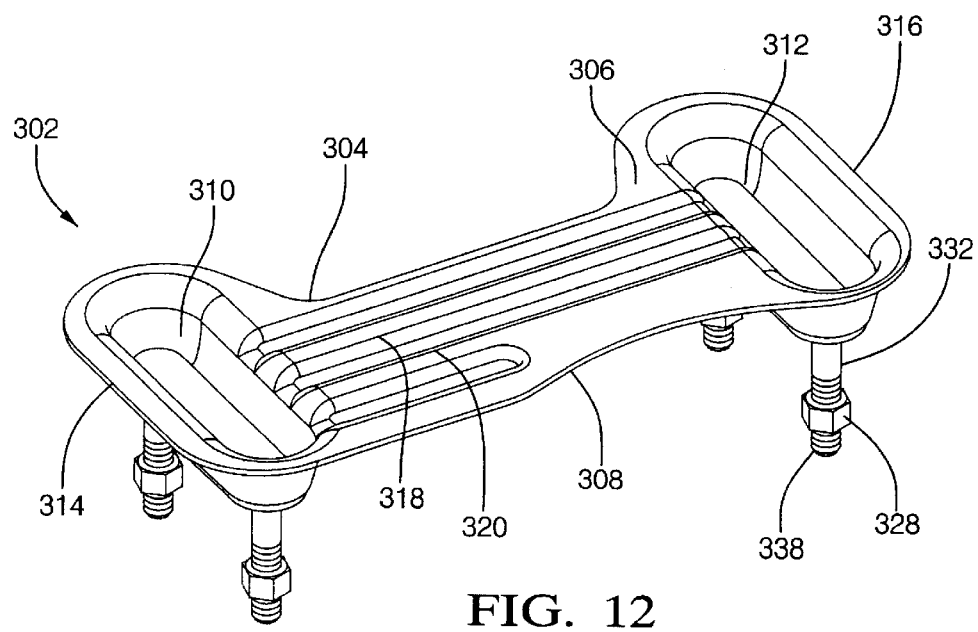
FIG. 12 is a perspective view of a load plate assembly in another embodiment of the present invention.
Figure 13:
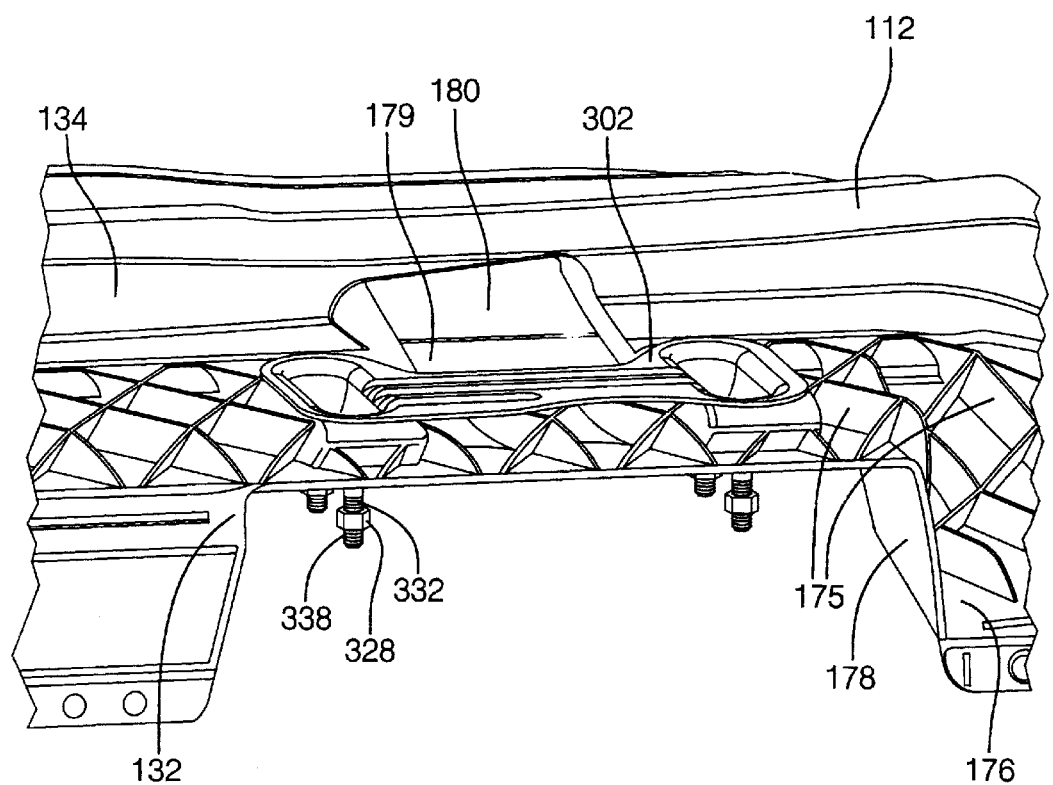
FIG. 13 is a perspective view of the load plate assembly of FIG. 12 coupled with a structural air duct assembly.
Figure 14:
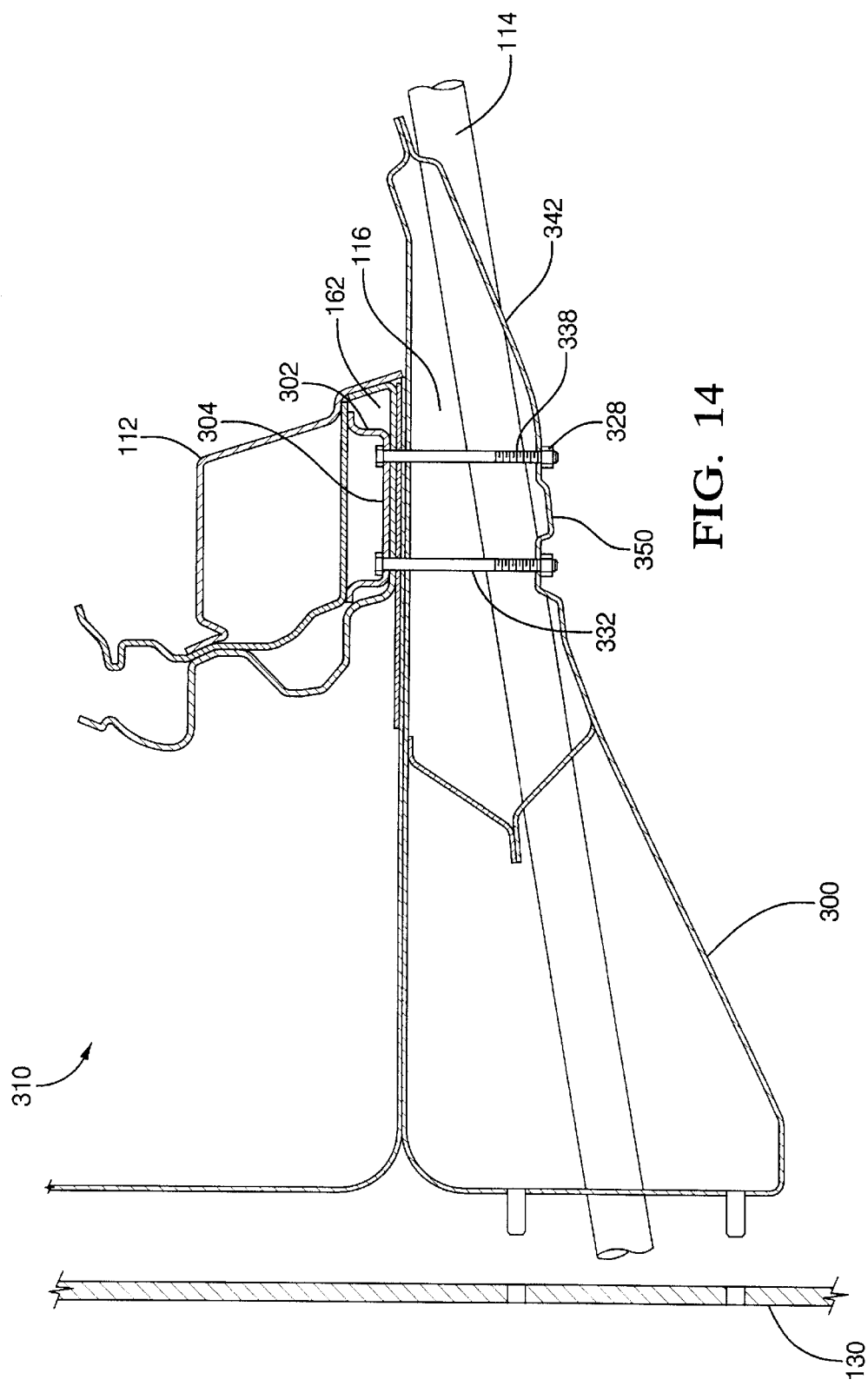
FIG. 14 is a cross section of a structural attachment system in another embodiment of the present invention.

Now referring to FIGS. 12–14, a load plate assembly in another embodiment of the present invention is shown generally at 302. Component parts performing similar or analogous functions to those described with reference to FIGS. 1–8 are labeled in multiples of 100. Component parts performing similar or analogous functions to those described with reference to FIGS. 9–11 are labeled in multiples of 300.

Load plate assembly 302 is similar to load plate assembly 202 with the exception that load plate assembly 302 does not include fasteners 328 securely coupled thereto. Instead, studs 332 are securely coupled to second surface 308 of plate member 304 and extend outwardly away from second surface 308. Thus, first and second recessed sections 310,312 do not have openings formed therein. It will be appreciated that studs 332 may be formed so that studs 332 are integral with the remaining portions of plate member 304.

In the exemplary embodiment, load plate assembly 302 has four studs 332 extending therefrom. When using load plate assembly 302 to attach steering column support unit 300 to air duct assembly 112, fasteners 328 are provided for being threadingly engaged to studs 332 at threaded end 338 located, in this embodiment, opposite plate member 304. Fasteners 328 may comprise any number of suitable fastening members and in one embodiment, fasteners 328 comprise conventional threaded nuts.

FIG. 13 shows load plate 302 nested within the plurality of structural ribs 175. The interaction between load plate member 304 and the plurality of structural ribs 175 is the same as previously discussed relative to load plate assembly 202.

FIG. 14 shows load plate assembly 302 being used to attach steering column support unit 300 to air duct assembly 112.

In this embodiment, plate member 304 is similarly disposed between first and second sections 132 and 134 within structural duct cavity 151 defined therebetween. Plate member 304 seats against first surface 176. Second section 134 seats against steering column support member 342 with studs 332 extending through the openings formed in steering column support member 342.

Studs 332 extend through second surface 350 of steering column support member 342 and protrude some distance therefrom to permit fasteners 328 to threadingly engage studs 332. Fasteners 328 are then tightened relative to studs 332 causing steering column support member 342 and second section 134 to be compressed between plate member 304 and fasteners 328. This results in steering column support unit 300 being securely attached to air duct assembly 112.

Load plate assembly 302 provides the same advantages noted above with reference to load plate assembly 202, namely that it provides load reinforcement at the concentrated attachment locations and in combination with structural ribs 175, the loads and stresses associated therewith are dispersed across air duct assembly 112 and throughout the vehicle structural system.

It will be understood that load plate assemblies 202 and 302 may be used in conjunction with steering column support unit 44 described herein above to mechanically attach unit 44 to structural air duct 12.

The present invention provides a simple yet effective system for providing attachment and load reinforcement at the point of attachment of various vehicle components. Particularly, the present invention provides a system of attaching and supporting a steering column to a structural air duct assembly by an attachment assembly.

The attachment assembly, in one embodiment, is a steering column support unit which at a first end attaches directly to the structural duct assembly and at a second end attaches to the steering column. The attachment assembly, in a second embodiment, utilizes a load plate assembly to attach the steering column support unit to the structural air duct assembly.

The present invention preserves the structural integrity of the attachment in critical load bearing areas. At the same time, the assembly allows for the utilization of a lightweight structural air duct assembly 12. Therefore, the mass of the entire assembly is advantageously reduced and minimized relative to other conventional assemblies which use much more massive parts for attaching vehicle components to one another.

Particularly, the invention allows for both the structural air duct assembly and the steering column support unit to be constructed of plastic or a fiber composite. This, as mentioned, reduces mass and also enables efficient disposal and recycling of the assembly and the unit.

Attachment element 52, load plate assemblies 202,302, and structural ribs 175 serve to provide load reinforcement in selected areas and, more specifically, in the load bearing area. Such reinforcement and support provides efficient and effective control, transfer, and distribution of loads associated with the steering column and also acts to regulate and control vertical oscillatory motion of the vehicle components, specifically the steering column.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A structural system for a vehicle, comprising:
  a) a first composite structural member;
  b) a vehicle component;
  c) an attachment member for attaching said first composite structural member and said vehicle component, said attachment member being configured, dimensioned and positioned to reinforce a load bearing area of said first composite structural member and to distribute a load of said vehicle component over said first composite structural member, said attachment member being formed from the same composite material as said first composite structural member, wherein said attachment member is molded as a part of said first composite structural member.

2. The system as in claim 1, wherein said vehicle component is a steering column.

3. The system as in claim 2, wherein said attachment member has a fiber reinforced area, said attachment member is molded as a part of said first composite structural member at said fiber reinforced area.

4. The system as in claim 3, wherein said first composite structural member includes a duct system for providing air to an internal compartment of said vehicle.

5. The system as in claim 4, wherein said first composite structural member is a cross car structural beam.

6. The system as in claim 5, wherein said attachment member includes an attachment portion for facilitating the attachment of said steering column to said cross car structural beam.

7. The system as in claim 4, wherein a first side of said attachment member is molded as a part of said first composite structural member and a second side of said attachment member is mounted to said steering column.

8. The system as in claim 7, wherein said second side is releasably mounted to said steering column.

9. A structural system for a vehicle, comprising:
  a) a structural air duct assembly having a load bearing surface;
  b) an attachment assembly for securing a steering column to said structural air duct assembly, said attachment assembly comprising:
    i) a steering column support unit;
    ii) a support unit cavity defined by said steering column support unit;
    iii) a steering column opening being configured to allow a portion of said steering column to pass through said support unit cavity when said steering column is secured to said structural air duct assembly; and
    iv) a pair of mounting members for securing said steering column to said support unit;
  wherein said attachment assembly is secured to at least said load bearing surface, said structural air duct assembly and said attachment assembly are formed from a composite fiber material, and said structural air duct assembly and said attachment assembly are integrally formed together.

10. The structural system as in claim 9, wherein said attachment assembly further comprises an attachment element, said attachment element being configured to have a contoured surface that is formed integrally with a portion of said structural air duct assembly.

11. The structural system as in claim 10, wherein said attachment element is selectively reinforced and said reinforcement provides reinforcement to said load bearing surface of said structural air duct assembly.

12. The structural system as in claim 11, wherein said attachment assembly further comprises a pair of knee bolsters.

13. The structural system as in claim 11, wherein said load bearing surface includes reinforcing members.

14. The structural system as in claim 13, wherein said load bearing surface is located where said steering column support unit is attached to said structural air duct assembly and said load bearing surface is located on an underside of said structural air duct assembly wherein said load bearing surface receives loads of said steering column and transfers the loads across and throughout said structural air duct assembly.

15. The structural system as in claim 11, wherein said mounting members each include a front portion configured to couple with an engine wall, a rear portion configured to couple with said steering column support unit and a steering column portion disposed between said front and rear portions and being configured to be secured to said steering column.

16. The structural system as in claim 15, wherein said mounting members are secured to said structural system by one of the following securement methods: chemical attachment, welding, or mechanical attachment.

17. The structural system as in claim 15, wherein said steering column portions are configured to transfer and distribute various loads of said steering column to said structural system.

18. The structural system as in claim 15, wherein said steering column portions include apertures to reduce mass of said mounting members.

19. The structural system as in claim 15, wherein said rear portions of said mounting members extend through a bottom portion of said steering column support unit into said support unit cavity and said rear portions are coupled to sides of said steering column support unit.

20. A structural system for a vehicle, comprising:
    a) a structural air duct assembly having a load bearing surface;
    b) an attachment assembly for securing a steering column to said structural air duct assembly, said attachment assembly comprising:
        i) a steering column support unit;
        ii) an attachment element;
        iii) a support unit cavity defined by said steering column support unit;
        iv) a steering column opening being configured to allow a portion of said steering column to pass through said support unit cavity when said steering column is secured to said structural air duct assembly; and
        v) a means for attaching said steering column to said steering column support unit, wherein said structural air duct assembly and said attachment assembly are formed from a composite fiber material and said structural air duct assembly and said attachment assembly are integrally formed together.

21. The structural system as in claim 20, wherein said attachment element has a contoured surface that is formed integrally with a portion of said structural air duct assembly.

22. The structural system as in claim 20, wherein said steering column support unit is formed of a composite fiber similar and compatible to the material used in forming said structural air duct assembly.

23. The structural system as in claim 20, wherein said attachment element is formed integrally with a portion of said structural air duct assembly and said attachment element transfers loads associated with said steering column to said structural air duct assembly and said attachment element regulates and controls vertical oscillatory motion of said steering column.

24. The structural system as in claim 20, wherein said steering column support unit is selectively reinforced at a point of attachment between said structural air duct assembly and said steering column support unit.

25. The structural system as in claim 24, wherein said selective reinforcement is provided by reinforcing elements.

26. The structural system as in claim 25, wherein said reinforcing elements are carbon fibers.

27. The structural system as in claim 26, wherein said reinforcing elements are fibers molded in said steering column support unit using a binding agent, said binding agent being similar to a binding agent used in forming the structural air duct assembly.

28. A structural system for a vehicle, comprising:
    a) a structural air duct assembly having a load bearing surface;
    b) an attachment assembly for securing a steering column to said structural air duct assembly, said attachment assembly comprising:
        i) a steering column support unit;
        ii) an attachment element;
        iii) a support unit cavity defined by said steering column support unit;
        iv) a steering column opening being configured to allow a portion of said steering column to pass through said support unit cavity when said steering column is secured to said structural air duct assembly; and
        v) a means for attaching said steering column to said steering column support unit, wherein said steering column support unit is formed of a composite fiber similar and compatible to the material used in forming said structural air duct assembly and said steering column support unit is molded as a part of said structural air duct assembly.

29. The structural system as in claim 28, wherein said steering column support-unit further comprises a discrete localized fiber reinforcement zone.

30. The structural system as in claim 29, wherein said attachment assembly further comprises a pair of knee bolsters.

31. The structural system as in claim 29, wherein said attachment element transfers loads associated with said steering column to said structural air duct assembly and said attachment element regulates and controls vertical oscillatory motion of said steering column.

32. The structural system as in claim 28, wherein said steering column support unit is selectively reinforced at a point of attachment between said structural air duct assembly and said steering column support unit.

33. The structural system as in claim 32, wherein said selective reinforcement is provided by reinforcing elements.

34. A method for distributing loads in a structural air duct assembly of a vehicle, comprising:

integrally molding a structural air duct assembly and a steering column support unit from a composite fiber material;

securing a steering column to said steering column support unit by at least a pair of mounting members, said mounting members transferring loads of said steering column to said structural air duct assembly.

35. The method as in claim 34, wherein the loads of said steering column are directed to an engine wall and an attachment element.

36. A structural system for a vehicle, comprising:

a structural member having a first section and a second section, said first and second sections being in a mated position so that said structural member defines one or more duct passageways; and an attachment assembly for securing a steering column to said first section of said structural member, a portion of said attachment member is molded as a part of said structural member, said structural member is molded of a first plastic material and said attachment assembly is molded of a second plastic material, said first and second plastic materials being similar and compatible to one another to enable recycling of the structural system.

37. The structural system as in claim 36, wherein said first and second sections are mated to one another at a first edge by a living hinge and at a second edge by a vibration weld.

38. The structural system as in claim 36, wherein said first and second plastic materials are composite fiber materials.

* * * * *